(12) United States Patent
Barnes et al.

(10) Patent No.: US 10,590,997 B2
(45) Date of Patent: Mar. 17, 2020

(54) PISTON ASSEMBLY

(71) Applicant: SCHAEFFLER TECHNOLOGIES AG & CO. KG, Herzogenaurach (DE)

(72) Inventors: Jay Barnes, Clinton Township, MI (US); Alaa Makke, Farmington Hills, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 83 days.

(21) Appl. No.: 15/839,129

(22) Filed: Dec. 12, 2017

(65) Prior Publication Data

US 2019/0178306 A1    Jun. 13, 2019

(51) Int. Cl.

| F16D 25/08 | (2006.01) |
|---|---|
| F16D 13/40 | (2006.01) |
| F16D 13/70 | (2006.01) |
| F16D 23/14 | (2006.01) |
| F16C 19/30 | (2006.01) |
| F16C 33/46 | (2006.01) |
| F16C 33/58 | (2006.01) |
| F16D 13/52 | (2006.01) |

(52) U.S. Cl.
CPC ............ F16D 25/083 (2013.01); F16C 19/30 (2013.01); F16C 33/4605 (2013.01); F16C 33/581 (2013.01); F16D 13/40 (2013.01); F16D 13/70 (2013.01); F16D 23/14 (2013.01); *F16D 13/52* (2013.01)

(58) Field of Classification Search
CPC ......... F16D 25/083; F16D 13/46; F16D 13/70
See application file for complete search history.

(56) References Cited

U.S. PATENT DOCUMENTS

| 3,429,410 | A | * | 2/1969 | Hansen | .................. F16D 25/082 |
|---|---|---|---|---|---|
| | | | | | 192/113.5 |
| 5,735,376 | A | * | 4/1998 | Moroto | ............... C03C 17/3639 |
| | | | | | 192/110 B |
| 5,908,096 | A | * | 6/1999 | Tsukamoto | ........... F16D 25/082 |
| | | | | | 192/48.607 |
| 7,036,645 | B2 | * | 5/2006 | Sowul | ................... F16D 13/585 |
| | | | | | 192/48.601 |
| 9,593,724 | B2 | | 3/2017 | Hemphill et al. | |

(Continued)

FOREIGN PATENT DOCUMENTS

CN            204716754 U       10/2015

*Primary Examiner* — Stacey A Fluhart
(74) *Attorney, Agent, or Firm* — Reid A. Baldwin

(57) ABSTRACT

Piston assemblies and clutch assemblies including the piston assemblies are disclosed. The clutch assembly may include at least one rotatable clutch plate, a reaction plate arranged to rotate with and apply a force to the at least one rotatable clutch plate, and a piston including a first segment having a radially extending portion. At least one bearing rolling element may be arranged between the reaction plate and the radially extending portion of the piston to permit relative rotational motion therebetween. A bearing cage may be retained by the reaction plate. The first segment of the piston may further include a retaining portion configured to retain the reaction plate. The retaining portion may include an axially extending portion having a radial bump, wherein the radial bump configured to retain the reaction plate. The radial bump may be disposed on a distal end of the retaining portion.

14 Claims, 2 Drawing Sheets

(56) References Cited

U.S. PATENT DOCUMENTS

| | | | |
|---|---|---|---|
| 2010/0288597 A1* | 11/2010 | Kuwahara | B60K 6/387 |
| | | | 192/85.61 |
| 2015/0267760 A1* | 9/2015 | Hemphill | F16D 13/52 |
| | | | 192/70.11 |

* cited by examiner

PISTON ASSEMBLY

TECHNICAL FIELD

The present disclosure relates generally to a piston assembly, for example, for use in a clutch assembly.

BACKGROUND

Transmission systems may include clutch assemblies. Such clutch assemblies may include a piston. During an engagement, the piston may be urged towards a clutch pack. An axial force from the piston may ultimately cause the clutch to be engaged.

SUMMARY

In at least one embodiment, a clutch assembly is provided. The clutch assembly may include at least one rotatable clutch plate; a reaction plate arranged to rotate with and apply a force to the at least one rotatable clutch plate; and a piston including a first segment having a radially extending portion. At least one bearing rolling element may be arranged between the reaction plate and the radially extending portion of the piston to permit relative rotational motion therebetween. A cage for positioning the at least one bearing rolling element may be retained by the reaction plate. The first segment of the piston further includes a retaining portion configured to retain the reaction plate.

In one embodiment, the retaining portion includes an axially extending portion having a radial bump, the radial bump configured to retain the reaction plate. The radial bump may be disposed on a distal end of the retaining portion. In another embodiment, the radial bump extends radially outward such that it at least partially overlaps an axially extending portion of the reaction plate in a radial direction. The axially extending portion of the retaining portion and the axially extending portion of the reaction plate may be parallel. The reaction plate may include a radial bump on a distal end of the axially extending portion, the radial bump configured to retain the cage. The radial bump of the retaining portion and the radial bump of the reaction plate may be spaced and opposite each other in an axial direction. In one embodiment, the reaction plate is configured to directly position the cage and the retaining portion is configured to directly position the reaction plate and indirectly position the cage.

In at least one embodiment, a piston is provided for a clutch assembly that includes a reaction plate that retains a cage of a bearing assembly. The piston may include a first segment and a second segment, the first segment including: a radially extending portion configured to contact a bearing rolling element of the bearing assembly; and a retaining portion configured to directly retain the reaction plate.

In one embodiment, the retaining portion includes an axially extending portion having a radial bump, the radial bump configured to retain the reaction plate. The radial bump may be disposed on a distal end of the retaining portion. In one embodiment, the radial bump extends radially outward such that it is configured to at least partially overlap an axially extending portion of the reaction plate in a radial direction. The axially extending portion of the retaining portion may be configured to be parallel to the axially extending portion of the reaction plate. In another embodiment, the reaction plate includes a radial bump on a distal end of the axially extending portion that is configured to retain the cage, and the radial bump of the retaining portion is configured to be spaced and opposite from the radial bump of the reaction plate in an axial direction. The reaction plate may be configured to directly position the cage and the retaining portion may be configured to directly position the reaction plate and indirectly position the cage.

DETAILED DESCRIPTION

At the outset, it should be appreciated that like drawing numbers appearing in different drawing views identify identical, or functionally similar, structural elements. Furthermore, it is understood that this disclosure is not limited only to the particular embodiments, methodology, materials and modifications described herein, and as such may, of course, vary. As those of ordinary skill in the art will understand, various features illustrated and described with reference to any one of the figures can be combined with features illustrated in one or more other figures to produce embodiments that are not explicitly illustrated or described.

The terminology used herein is for the purpose of describing particular aspects only, and is not intended to limit the scope of the present disclosure, which is limited only by the appended claims. It is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments.

Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
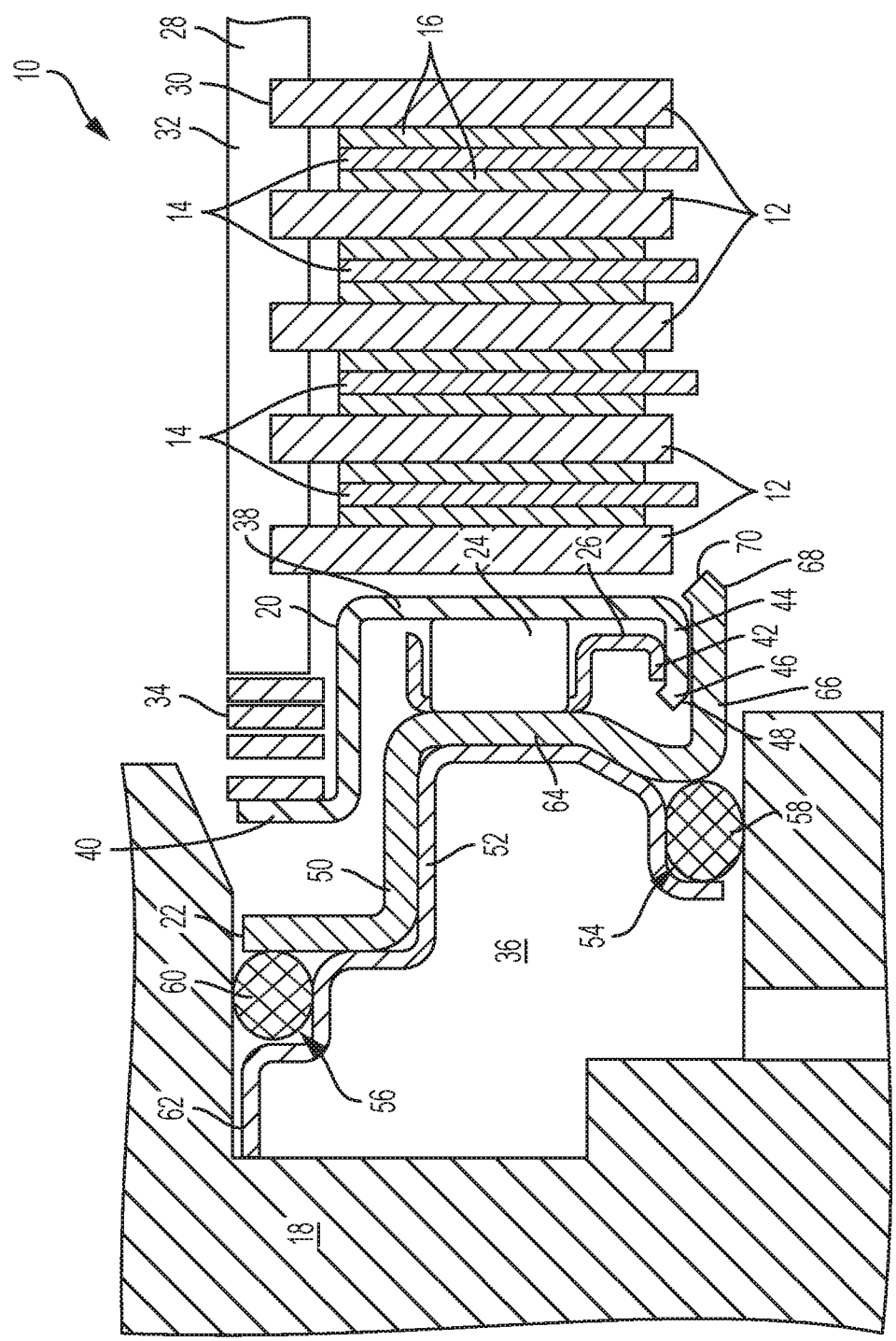
FIG. 1 is a cross-sectional view of a clutch assembly, according to an embodiment.

With reference to FIG. 1, an example cross-sectional view of a clutch assembly 10 is shown. The clutch assembly 10 may be a transmission clutch assembly and may be incorporated into a rear differential unit (RDU), for example. Transmission clutch assembly 10 includes clutch plates 12 and friction plates 14 which may be collectively referred to as a clutch pack. Friction plates 14 include friction material rings 16 on each side. Clutch plates 12 are rotatable with respect to housing 18 for the transmission. Although five clutch plates and four friction plates are shown, other numbers of clutch plates and friction plates are possible. An example of a clutch assembly is shown and described in U.S. Pat. No. 9,593,724, filed Feb. 27, 2015, the entire disclosure of which is incorporated by reference herein. The description and embodiments disclosed therein in may be combined with the present disclosure to create further embodiments.

Transmission clutch assembly 10 may include reaction plate 20, piston 22, bearing rolling element 24, and cage 26. Reaction plate 20 (which may also be referred to as a Z-disk) may be arranged to rotate with and apply a force to clutch plate 12, although in other embodiments, plate 20 may apply a force to one of friction plates 14. In other words, the reaction plate may be configured to engage the clutch pack. Piston 22 may be non-rotatable with respect to housing 18 and sealed to housing 18. During normal operation of clutch pack 10, piston 22 may not rotate in the housing, allowing for a robust sealing and decreased leakage at the seal, thereby reducing pumping losses.

Bearing rolling element 24 may be arranged between and contactable with the reaction plate 20 and the piston 22 to permit relative rotational motion therebetween. Bearing rolling element 24 may be one of a plurality of rolling elements, such as cylindrical rollers, arranged to roll between the reaction plate 20 and piston 22 during relative rotation between the two components. Cage 26 is for retaining and positioning rolling elements 24 radially and maintaining proper spacing in a circumferential direction. Cage 26 may be retained by reaction plate 20, as described below. The bearing rolling elements 24 and cage 26 may be collectively referred to as a bearing element.

Clutch carrier 28 may be rotationally engaged with clutch plate 12. That is, the clutch plate 12 may have an external toothed portion 30 engaged with a carrier internal complementary spline portion 32 so that the clutch plate 12 and carrier rotate in unison but the clutch plate can still move axially in the carrier to engage the clutch. Otherwise stated, the clutch pack is installed in the carrier. Rearmost clutch plate 12 may be axially retained by a carrier feature or snap ring (not shown). Release spring 34 may be installed between and compressively engaged with the clutch carrier 28 and the reaction plate 20 to urge the reaction plate 20 away from the clutch plate 12. That is, without sufficient hydraulic pressure in chamber 36 formed by housing 18 and piston 22 to engage the clutch, spring 34 may disengage the clutch. In one embodiment, the spring 34 may be a wave spring.

Reaction plate 20 may include radial portion 38, which may be contactable with the rotatable clutch plate 12 on one side and the bearing rolling element 24 on the other side. Reaction plate 20 may include radial portion 40 contactable with the spring. Portion 38 may be radially inside of portion 40. Portion 40 may also include a toothed portion (not shown) engaged with clutch carrier spline portion 32 so that the reaction plate 20 and the clutch carrier 28 are rotationally connected.

Cage 26 may include circumferential ring 42. Reaction plate 20 may include circumferential ring 44 with a radial bump 46 at distal end 48. Cage ring 42 may be retained by radial bump 46. That is, the cage 26 may be retained on the reaction plate 20 and prevented from being removed by the bump 46. The bump 46 may be a pre-formed feature in which case the cage 26 would be snapped onto the reaction plate 20, or the bump 46 may be formed after the cage 26 is installed onto the reaction plate 20 by staking or the like.

Piston 22 may include segments, or plates, 50 and 52, which may be fixed to one another (although not required) and may provide a pair of o-ring grooves 54 and 56. Segments 50 and 52 may be fixed together by any suitable technique, such as press-fitting, adhesives, or riveting (or other fasteners), for example. In one embodiment, the segment 50 may be a hardened segment or washer and the segment 52 may be a non-hardened or soft segment/washer. Accordingly, the segment 50 may have a greater hardness and/or strength (e.g., yield strength) than segment 52. Segment 50 may be contactable with bearing rolling element 24 on a radial portion 64 (e.g., radial portion 64 may be a bearing raceway) and segment 52 may include an axial protrusion 62 for limiting a disengagement travel of piston 22. Piston 22 may include o-rings 58 and 60 installed in grooves 54 and 56, respectively, for sealing with inner and outer portions, or circumferential surfaces, of the housing, respectively. In other words, o-rings 58 and 60 may be radially inner and outer seals, respectively.

During an engagement, hydraulic pressure in chamber 36 may urge piston 22 towards the clutch pack. An axial force from the piston 22 may act on bearing rolling element 24, which in-turn acts on reaction plate 20, overcoming force from spring 34. The reaction plate 20 may press against clutch plate 12 to clamp the clutch pack and engage the clutch. Because the reaction plate and the clutch plate are both rotationally fixed to the clutch carrier and rotate together, there may be no relative motion between the two components. In other embodiments, the two may not be rotationally connected, but friction from spring 34 acting on the reaction plate 20 and the clutch carrier 28 may keep the two at a similar rotational speed. Bearing rolling element 24 may effectively rotationally disconnect the piston 22 from the rotating reaction plate 20 so that the piston 22 is not rotating and can use conventional static seals against the non-rotating housing.

Figure 2:
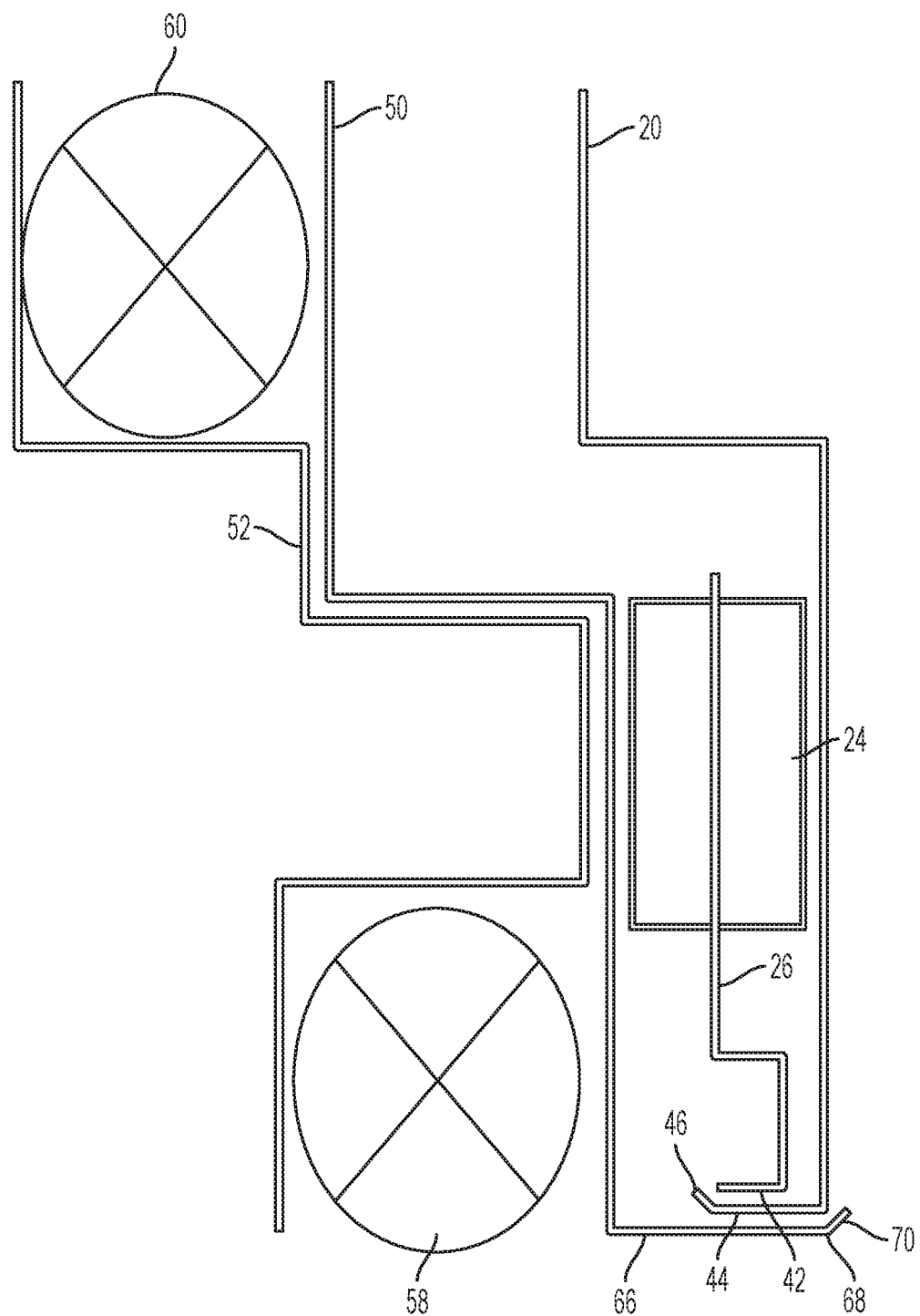
FIG. 2 is a schematic diagram of a piston and bearing assembly within a clutch assembly, according to an embodiment.

With reference to FIGS. 1 and 2, in at least one embodiment, a portion of the piston 22, such as segment 50, may include a portion 66 that extends in the axial direction, or substantially in the axial direction. FIG. 2 is similar to FIG. 1, but more schematic in nature and with some components removed for clarity. The portion 66 may have a distal end 68 that extends past the portion 38 of the reaction plate 20 in a direction towards the clutch plates 12 (e.g., to the right, as shown). The distal end 68 may include a radial bump 70, which may be configured to retain the reaction plate 20. For example, the reaction plate 20 may be snapped into the segment 50 or the radial bump 70 may be formed after the reaction plate 20 is installed onto the segment 50 (e.g., by staking or the like). Accordingly, the portion 66 and the radial bump 70 may together be referred to as a retaining portion of the segment 50. In some embodiments, however, there may not be a radial bump 70, and the axial portion 66 may comprise the retaining portion In one embodiment, the radial bump 70 may extend in a radially outward direction such that it at least partially overlaps the circumferential ring 44 in the radial direction. In another embodiment, the radial bump 70 may extend radially outward beyond the circumferential ring 44. The portion 66 and the circumferential ring 44 may be parallel or substantially parallel. The radial bump 70 may extend completely around the segment 50 in the circumferential direction (e.g., it may be continuous). The portion 66 and radial bump 70 may retain and/or guide the reaction plate 20 (also referred to as piloting). In turn, the reaction plate 20 may retain/guide/pilot the bearing cage 26. Accordingly, the piston 22 may indirectly retain/guide/pilot the bearing cage 26 (and therefore the bearing element as a whole). The disclosed assembly provides for piloting/locating of the bearing element and the reaction plate 20 without additional components (e.g., piloting is accomplished with components already present in the assembly, but with modified structure).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A clutch assembly comprising:
   at least one rotatable clutch plate;
   a reaction plate arranged to rotate with and apply a force to the at least one rotatable clutch plate;
   a piston including a first segment having a radially extending portion;
   at least one bearing rolling element arranged between the reaction plate and the radially extending portion of the piston to permit relative rotational motion therebetween;
   a cage for positioning the at least one bearing rolling element, the cage in contact with and retained by the reaction plate; and
   the first segment of the piston further including a retaining portion configured to contact and retain the reaction plate.

2. The clutch assembly of claim 1, wherein the retaining portion includes an axially extending portion having a radial bump, the radial bump configured to retain the reaction plate.

3. The clutch assembly of claim 2, wherein the radial bump is disposed on a distal end of the retaining portion.

4. The clutch assembly of claim 2, wherein the radial bump extends radially outward such that it at least partially overlaps an axially extending portion of the reaction plate in a radial direction.

5. The clutch assembly of claim 4, wherein the axially extending portion of the retaining portion and the axially extending portion of the reaction plate are parallel.

6. The clutch assembly of claim 4, wherein the reaction plate includes a radial bump on a distal end of the axially extending portion, the radial bump configured to retain the cage.

7. The clutch assembly of claim 6, wherein the radial bump of the retaining portion and the radial bump of the reaction plate are spaced and opposite each other in an axial direction.

8. The clutch assembly of claim 1, wherein the reaction plate is configured to directly position the cage and the retaining portion is configured to directly position the reaction plate and indirectly position the cage.

9. A clutch assembly comprising:
   a reaction plate that retains a cage of a bearing assembly; and
   a piston having a first segment and a second segment, the first segment including:
      a radially extending portion configured to contact a bearing rolling element of the bearing assembly; and
      a retaining portion configured to directly contact and retain the reaction plate.

10. The clutch assembly of claim 9, wherein the retaining portion includes an axially extending portion having a radial bump, the radial bump configured to retain the reaction plate.

11. The clutch assembly of claim 10, wherein the radial bump extends radially outward such that it is configured to at least partially overlap an axially extending portion of the reaction plate in a radial direction.

12. The clutch assembly of claim 11, wherein the axially extending portion of the retaining portion is configured to be parallel to the axially extending portion of the reaction plate.

13. The clutch assembly of claim 11, wherein the reaction plate includes a radial bump on a distal end of the axially extending portion that is configured to retain the cage, and the radial bump of the retaining portion is configured to be spaced and opposite from the radial bump of the reaction plate in an axial direction.

14. The clutch assembly of claim 9, wherein the reaction plate is configured to directly position the cage and the retaining portion is configured to directly position the reaction plate and indirectly position the cage.

* * * * *